United States Patent [19]
Marganski et al.

[11] Patent Number: 5,824,145
[45] Date of Patent: Oct. 20, 1998

[54] METHOD FOR MAKING A PHOTODURABLE AQUEOUS TITANIUM DIOXIDE PIGMENT SLURRY

[75] Inventors: Robert Elroy Marganski; Michael Warren Ott, both of Newark, Del.

[73] Assignee: E. I. du Pont de Nemours and Company, Wilmington, Del.

[21] Appl. No.: 856,062

[22] Filed: May 14, 1997

[51] Int. Cl.⁶ .................................................. C09C 1/36
[52] U.S. Cl. ...................... 106/442; 106/436; 106/443; 106/445; 428/403
[58] Field of Search .................... 106/442, 443, 106/445, 436; 428/403

[56] References Cited

U.S. PATENT DOCUMENTS

| | | | |
|---|---|---|---|
| 2,187,050 | 1/1940 | Patterson | 106/442 |
| 3,770,470 | 11/1973 | Swank | 106/442 |
| 4,214,913 | 7/1980 | Glaeser | 106/437 |
| 4,376,655 | 3/1983 | Weber | 106/442 |
| 5,356,470 | 10/1994 | Ott et al. | 106/437 |
| 5,554,216 | 9/1996 | Baidins et al. | 106/442 |

FOREIGN PATENT DOCUMENTS

Hei 3-275768  12/1991  Japan .............................. C09C 1/36

OTHER PUBLICATIONS

W.H.Daiger and W.H.Madson, Chalk–Fade Evaluation of Pigmented Finishes by Use of Instrumentation and Computer Analysis, *Journal of Paint Technology*, vol. 39, No. 510, 399–410, Jul., 1967.

*Primary Examiner*—Mark L. Bell
*Assistant Examiner*—Scott L. Hertzog

[57] ABSTRACT

This invention relates to a new method for making a photodurable, aqueous titanium dioxide ($TiO_2$) pigment slurry. The method involves mixing amorphous alumina, $TiO_2$ pigment particles, water, and at least one dispersant to form the slurry. The initial slurry comprises at least about 78 wt. % $TiO_2$ solids and at least about 3 wt. % alumina. The resulting slurry may be diluted to a lower $TiO_2$ solids content and subsequently screened and media-milled. The titanium dioxide pigment slurry is suitable for use in coatings formulations such as paints.

20 Claims, 1 Drawing Sheet

1

METHOD FOR MAKING A PHOTODURABLE AQUEOUS TITANIUM DIOXIDE PIGMENT SLURRY

BACKGROUND OF THE INVENTION

1. Field of the Invention

This invention relates to a new method for making a photodurable, aqueous titanium dioxide ($TiO_2$) pigment slurry. The method involves mixing amorphous alumina, $TiO_2$ pigment particles, water, and at least one dispersant to form the slurry. The resulting photodurable, aqueous $TiO_2$ pigment slurry is particularly useful for incorporating into coating formulations such as paints.

2. Description of the Related Art

Generally, titanium dioxide ($TiO_2$) pigment is commercially produced by the "chloride" or "sulfate" process. In the "chloride" process, titanium tetrachloride ($TiCl_4$) is oxidized in the vapor phase with an oxygen-containing gas, typically in the presence of aluminum chloride ($AlCl_3$), to produce a hot gaseous suspension of $TiO_2$ solid particulate. This crude $TiO_2$ particulate is then subjected to certain finishing and grinding treatment depending on the desired type of final $TiO_2$ pigment product.

Generally, the finishing and grinding treatment involves the steps of: (a) dispersing the crude $TiO_2$ particles in an aqueous medium to form a slurry having a low $TiO_2$ solids concentration; (b) precipitating an inorganic oxide coating (e.g., alumina, and/or silica) onto the surfaces of the $TiO_2$ particles; (c) recovering the inorganic oxide surface-treated $TiO_2$ particles from the aqueous medium by filtering; (d) washing and filtering the $TiO_2$ particles to remove by-product salts and impurities therefrom; (e) drying the washed $TiO_2$ pigment particles; (f) dry-grinding the dried $TiO_2$ pigment particles to a desired particle size using a fluid-energy mill, and optionally, if an aqueous slurry is desired, (g) dispersing the pigment product in water to produce a slurry typically having a $TiO_2$ solids content of 72 to 76 wt. %.

The resultant aqueous $TiO_2$ pigment slurry may be used in many end-use applications such as in the manufacture of coatings (e.g., paints). The $TiO_2$ pigment efficiently scatters visible light, thereby imparting whiteness, brightness, and opacity when incorporated into coating formulations. Since many coatings containing $TiO_2$ pigment are exposed to severe weather conditions, it is important that the $TiO_2$ pigment be photodurable in order to provide these coatings with good resistance to chalking and discoloration. Particularly, many paints contain organic binders which are susceptible to photochemical attack and degrade over time on exposure to sunlight, moisture, temperature change, and other conditions to form oxygenated species that solubilize and wash away from the surface of the paint. Chalking occurs as increased amounts of organic binder are removed from the paint's surface, causing $TiO_2$ and extender pigments to protrude through the paint's surface and producing a white, chalky appearance. By itself, the surface of the $TiO_2$ pigment particle is photochemically active and can promote degradation of the organic binders under certain conditions. However, this form of degradation can be controlled by the application of inorganic oxide coatings (e.g., alumina and/or silica) onto the surfaces of the $TiO_2$ particles. The inorganic oxide surface treatment forms a barrier between the surfaces of the $TiO_2$ particles and the organic binders.

Although the above-described process effectively produces a $TiO_2$ pigment slurry suitable for use in coating applications, the process involves several energy-intensive steps and the processing equipment requires high capital investment. Thus, it would be desirable to have a direct slurry-manufacturing process, wherein the steps of filtering, washing, drying, and grinding, and reslurrying the $TiO_2$ particles were eliminated. Others skilled in the art have attempted to develop such a direct slurry-manufacturing process with different steps.

For example, Ott et al., U.S. Pat. No. 5,356,470 discloses a process for making an aqueous $TiO_2$ pigment slurry, wherein the amount of oversized $TiO_2$ particles having a particle size greater than 1 micron in the slurry are reduced. The process involves making an aqueous slurry having about 79 to 83% by weight $TiO_2$ solids, wherein the slurry is viscous shear-processed. The slurry is then diluted to a point sufficient to permit slurry handling and transferring. The slurry is then media-milled to reduce the size of the $TiO_2$ particles. The resulting $TiO_2$ slurry is particularly suitable for coating paper products, but the slurry does not have good photodurability, since there is no wet-treatment of the $TiO_2$ particles with an alumina or silica coating.

Patterson, U.S. Pat. No. 2,187,050 discloses a process for making a stable, light, and weather-resistant $TiO_2$ pigment. The process involves preparing a solution of aluminum sulfate and adding a basic precipitant such as ammonium hydroxide to the solution during agitation, until a precipitate of hydrated aluminum oxide is obtained. After washing and filtration, an aqueous slurry of the hydrated aluminum oxide is prepared, and this slurry is added to an aqueous slurry of $TiO_2$ pigment. The $TiO_2$ pigment slurry is then filtered, and the resulting $TiO_2$ pigment is dried and ground. At page 2 of the patent, the amount of aluminum oxide applied to the $TiO_2$ pigment is described as generally not exceeding substantially 2 wt. % based on weight of $TiO_2$ pigment, although the patent also states that amounts as high as 5–10 wt. % may be utilized.

Weber, U.S. Pat. No. 4,376,655 discloses a process for preparing an aqueous slurry of titanium dioxide suitable for use in coating paperboard products and incorporation into other water-based coating products. The process involves blending particulate titanium dioxide, water, and amorphous aluminum hydroxide. In the examples, the concentration of alumina gel [$Al(OH)_3$] calculated as $Al_2O_3$] which is added to the various $TiO_2$ slurries ranges from 0 wt. % to 1.91 wt. %. In the patent, the typical $TiO_2$ solids content in the slurry is described as being about 72 wt. %, and the patent states that a solids content of as low as about 50% by weight and as high as about 77% by weight can be utilized.

The present invention provides a new method for making a photodurable, aqueous $TiO_2$ pigment slurry, wherein the photodurability of the slurry is significantly improved. In the direct slurry manufacturing method of this invention, the cost-intensive and conventional processing steps of filtration, drying, and grinding are eliminated. The resulting photodurable, aqueous $TiO_2$ pigment slurry can be incorporated into coating formulations such as paints.

SUMMARY OF THE INVENTION

The present invention provides a method for making a photodurable, aqueous titanium dioxide pigment slurry, comprising mixing amorphous alumina, $TiO_2$ pigment particles, water, and at least one dispersant to produce a photodurable, aqueous $TiO_2$ slurry comprising at least about 78 wt. % $TiO_2$ solids based on the total weight of slurry and at least about 3 wt. % alumina based on the total weight of $TiO_2$ solids. Preferably, the slurry comprises about 78 to about 88 wt. % $TiO_2$ solids based on the total weight of slurry, and the alumina content is in the range of about 3 to about 5 wt. % based on the total weight of $TiO_2$ solids. Preferred dispersants include those selected from the group consisting of citric acid, polyacrylates, triethanolamine, 2-amino-2-methyl-1-propanol, monoisopropylamine, and mixtures thereof. The pH of the slurry is preferably adjusted to a level in the range of about 6.0 to about 9.0 by the addition of an alcoholamine to the slurry. The $TiO_2$ particles used to make the slurry may be in rutile or anatase form. The base rutile $TiO_2$ particles initially used to make the slurry may also have a coating comprising about 0.1 to about 0.5 wt. % $P_2O_5$.

In another embodiment, the above-described resulting aqueous $TiO_2$ pigment slurry having a relatively high $TiO_2$ solids content is subsequently diluted to a lower $TiO_2$ solids content of less than about 80 wt. % and preferably in the range of about 72 to about 78 wt. %. This slurry having a low $TiO_2$ solids content may then be screened to remove grit and media-milled to reduce the size of the $TiO_2$ particles.

DETAILED DESCRIPTION OF THE INVENTION

Figure 1:
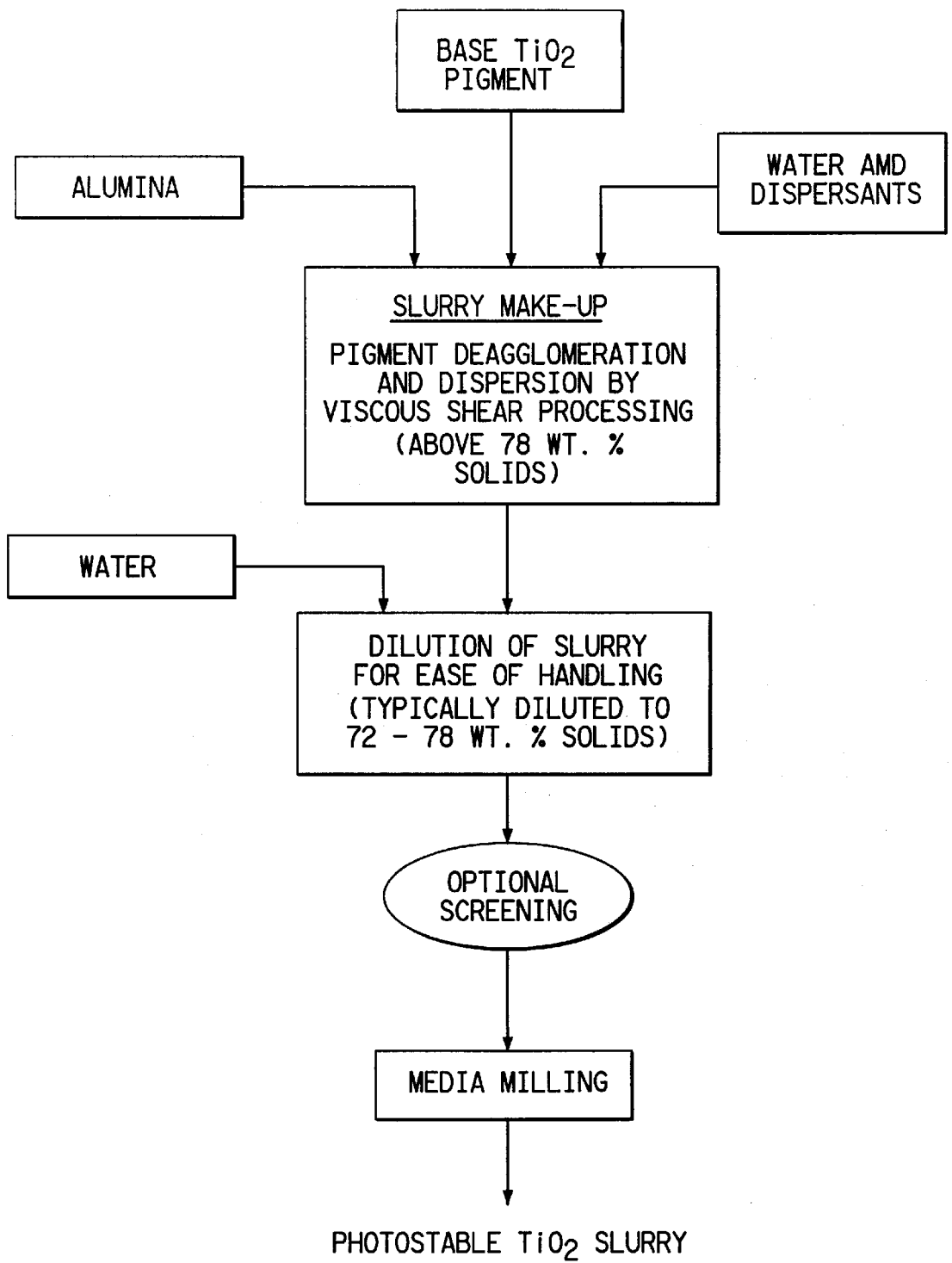
FIG. 1 shows a schematic diagram for a preferred embodiment of making the photodurable, aqueous $TiO_2$ slurry of this invention.

This present invention provides a new method for making a photodurable, aqueous titanium dioxide ($TiO_2$) pigment slurry. The method involves mixing amorphous alumina, $TiO_2$ pigment particles, water, and at least one dispersant to form the slurry.

Conventional $TiO_2$ pigment may be used to prepare the aqueous slurry of this invention. Typically, $TiO_2$ pigment is commercially manufactured by either the chloride or sulfate process, and the $TiO_2$ pigment has substantially a rutile or anatase crystalline structure. Preferably, rutile $TiO_2$ pigment made by the chloride process is used in the present invention. Generally, in the chloride process for manufacturing rutile $TiO_2$ pigment, a titanium tetrahalide such as titanium tetrachloride ($TiCl_4$) in the vapor phase is reacted with an oxygen-containing gas in a reactor at a temperature of about 900° to 1600° C. to produce a hot gaseous suspension of $TiO_2$ solid particulate and free chlorine.

Particularly, in such a process, $TiCl_4$ is first evaporated and preheated to temperatures of from about 300° to about 650° C. and introduced into a reaction zone of a reactor. Aluminum compounds, such as $AlCl_3$, $AlBr_3$, and/or $AlI_3$, and preferably $AlCl_3$ are thoroughly mixed with the $TiCl_4$ prior to its introduction into the reaction zone. Preferably, $AlCl_3$ is used in the process. The aluminum compound becomes incorporated on the surface of the $TiO_2$ particles as aluminum oxide ($Al_2O_3$). The amount of aluminum compound added is sufficient to provide about 0.5 to about 1.5% by weight $Al_2O_3$ based on total $TiO_2$ solids formed in the oxidation reaction. The oxygen-containing gas is preheated to at least 1200° C. and is continuously introduced into the reaction zone through a separate inlet from the inlet for the $TiCl_4$ feed stream. The reaction of $O_2$ and $TiCl_4$ in the vapor phase is extremely fast and forms a hot gaseous suspension of $TiO_2$ solid particulate. Other co-oxidants and rutile promoters may be added at the point of addition of the aluminum compound or further downstream in the process. For example, $PCl_3$ may be added at one or more points downstream from where the $TiCl_4$ and oxygen-containing gas are initially contacted as described in Glaeser, U.S. Pat. No. 4,214,913, the disclosure of which is hereby incorporated by reference. The phosphorous compound becomes incorporated on the surface of the $TiO_2$ particles as phosphorous oxide ($P_2O_5$). In the present invention, it can be advantageous for the $TiO_2$ pigment to contain about 0.1 to about 0.5 wt. % $P_2O_5$, since the $P_2O_5$ improves the deagglomeration of the base $TiO_2$ pigment.

The hot gaseous suspension of $TiO_2$ solid particulate is then rapidly cooled in order to prevent undesirable particle size growth. Cooling of the hot gaseous suspension may be performed by methods known in the art. These methods typically involve passing the hot gaseous suspension through a cooling conduit (flue) having relatively cool walls in comparison to the gaseous suspension. Granular scouring particles (scrubs), such as calcined $TiO_2$, NaCl, sand, and mixtures thereof may be added to the flue to reduce the formation of $TiO_2$ particulate deposits on the internal walls of the flue.

In the alternative sulfate process, titanium ore is dissolved into sulfuric acid which is followed by filtration steps to remove any insoluble metal sulfates, hydrolysis of the titanyl sulfate to titanium hydroxide, and then a calcination step to produce either rutile or anatase $TiO_2$ pigment.

Conventional rutile or anatase $TiO_2$ pigment is suitable for use in this invention. For example, as described-above, base $TiO_2$ pigment particles which commonly refer to the pigment particles produced by the chloride or sulfate process prior to the application of any surface-treatments can be used. Raw $TiO_2$ pigment particles collected as cyclone discharge from the oxidation reactor in the chloride process contain residual chlorides, but these particles may be used after the particles have been treated to remove the residual chlorides. Conventional methods, such as treating the particles with superheated steam or hot humid air, may be used to remove the residual chlorides. Base $TiO_2$ pigment which is subjected to injector-treatment (IT) with 450° C. steam in accordance with the methods described in U.S. Pat. No. 4,083,946, the disclosure of which is hereby incorporated by reference, may also be used. Injector-treatment reduces the base $TiO_2$ pigment acidity/chlorides which reduces the amount of alcoholamine needed for pH control. By giving partial deagglomeration of the base pigment, injector-treated pigment can be processed at an increased solids content during the dispersion step.

In another embodiment, $TiO_2$ pigment particles which have been surface-treated with an inorganic oxide coating, such as alumina, silica, zinc, and/or boron can be used. Also, $TiO_2$ pigment particles which have been micronized by steam to a desired particle size and which have not been surface-treated are suitable for use.

The amorphous alumina ($Al_2O_3$) used to prepare the aqueous slurry of this invention may be in any suitable form including in the form of presscake, powder, aqueous slurry, wet gel, or dried gel which typically contains at least 10 wt. % amorphous alumina to minimize the amount of water and thus avoid water balance problems in later dilution steps in the paint or other coating product manufacturing process. It is important that the alumina be in the amorphous form to impart good photodurability in the organic binder systems of the finished coating product. In addition, it is important that the alumina be low in residual ionic salts to avoid detrimental effects in such organic binder systems. The amorphous alumina should be in a purified form. Commercially-available amorphous alumina gels can be used or the alumina gel can be prepared by the following steps: (i) adding citric acid up to about 0.5 weight % to water at about 60° C.

to form a citric acid solution, (ii) adding sodium aluminate (about 7.5 weight percent) to the citric acid solution, while stirring, (iii) adding concentrated hydrochloric acid (or other acid capable of neutralizing sodium aluminate) up to about 4.8 weight percent to the solution, while stirring, (iv) adjusting the pH of the solution to about 8.0 with sodium hydroxide solution, (v) stirring the resulting alumina suspension for about an hour, and (vi) filtering and washing the alumina until the wash water conductivity is about 1 microohms.

Commercially-available dispersants can be used to prepare the aqueous $TiO_2$ pigment slurry of this invention. These dispersants include, for example, sodium or potassium pyrophosphate; sodium hexametaphosphate; sodium, potassium, or ammonium polyphosphate; aliphatic carboxylic acid; citric acid; polyhydroxy alcohols; polyacrylates and the like; and alcoholamines such as 1-amino-2-ethanol; 2-amino-1-ethanol, 1-amino-2-propanol, 2-amino-2-methyl-1-propanol, diethanolamine, di-isopropanolamine, 2-methylamino-1-ethanol, monoisopropanolamine, triethanolamine, and the like, and mixtures thereof. The pH of the slurry is preferably adjusted to a level in the range of about 6.0 to about 9.0 by the addition of at least one of the above-mentioned alcoholamines to the slurry.

The $TiO_2$ pigment particles, amorphous alumina, at least one dispersant, and water are mixed together to form the aqueous $TiO_2$ pigment slurry of this invention. The mixing of these ingredients results in deagglomeration and deposition of the fine particles of alumina onto the surfaces of the $TiO_2$ pigment particles. It is recognized that other ingredients, for example, fluoride ions, may be added to the slurry. The mixing process can be carried out continuously or batchwise.

In one example of a batch process, as described in further detail in the examples below, a presscake of amorphous alumina is first prepared and then added to an aqueous slurry of $TiO_2$ pigment, and the mixture is stirred under high shear conditions using a high speed mixer. The pH of the slurry is adjusted to a level of about 6.0 to about 9.0 by adding at least one dispersant to the slurry, and the slurry is further stirred to produce a slurry which can be subsequently diluted to a desired $TiO_2$ solids content.

As the $TiO_2$ solids content is increased, the viscosity of the slurry increases and the slurry is stirred under high shear conditions using a high speed mixer. It is important that the $TiO_2$ particles be sufficiently dispersed and incorporated into the slurry. Under high shear conditions at a high solids content, the $TiO_2$ particle agglomerates are broken-up by the high shear stress zones resulting in improved dispersion of the $TiO_2$ particles into the slurry. With such processing conditions, the incorporation of the $TiO_2$ particles into the slurry is improved by increasing the mixing speed of the mixer.

In a continuous process, the $TiO_2$ pigment is continuously and simultaneously added to a tank along with the amorphous alumina, water, and at least one dispersant, such that the tank is always maintained at the required $TiO_2$ solids content for good high shear processing. Simultaneously, with the addition of new material, a portion of the processed aqueous $TiO_2$ slurry in the tank is removed. The processed $TiO_2$ slurry may be removed by any suitable means, typically from the bottom of the tank by gravity flow or a conveying screw.

The water content of the slurry is dependent on the desired viscosity and $TiO_2$ solids content of the slurry. However, it is important that the initial $TiO_2$ solids content be at least about 78 wt. % based on total weight of the slurry in order that high shear stress zones may be created during the viscous shear processing of the slurry. The $TiO_2$ particle agglomerates are broken-up by the high shear stress zones resulting in improved dispersion of the $TiO_2$ particles into the slurry. Generally, the initial $TiO_2$ solids content of the slurry is at least about 78 wt. % and is preferably in the range of about 78 to about 88 wt. %. It is also important that the alumina ($Al_2O_3$) content of the slurry be at least about 3 wt. % based on the total weight of $TiO_2$ solids in order to produce a photodurable slurry in accordance with this invention. The alumina becomes incorporated on the surface of the $TiO_2$ particles and imparts photodurability to the $TiO_2$ particles in the slurry. Preferably, the alumina content of the slurry is in the range of about 3 to about 5 wt. % based on the total weight of $TiO_2$ solids.

The slurry may then be diluted to a desired $TiO_2$ solids content to provide an aqueous slurry which can be more easily transported to other sites such as a paint manufacturing facility. For example, in many applications, it is desirable that the slurry be diluted to a final $TiO_2$ solids content of less than about 80 wt. %, preferably about 68 to about 78 wt. %, and more preferably about 72 to about 78 wt. %. This resulting aqueous slurry has rheological properties similar to those of conventional slurries made by mixing micronized $TiO_2$ pigment particles with water and dispersants.

The slurry may then be subjected to a screening process to remove any grit, and the screened slurry may be mediamilled to reduce the size of the $TiO_2$ particles by techniques known in the art such as those described in Ott et al., U.S. Pat. No. 5,356,470. These screening and media-milling steps do not affect the photodurability of the pigment, but they may improve Theological and end-use properties such as the gloss of paints containing these pigments.

A preferred embodiment of the method of the present invention is illustrated in the schematic diagram of FIG. 1.

The present invention is further illustrated by the following examples, but these examples should not be construed as limiting the scope of the invention. The following Test Methods were used to measure various properties of the slurries produced in the examples.

Test Methods

1. Catalytic Activity Coefficient (CAC)

Durability of a pigment is usually measured as resistance to chalking over long-term (e.g., 2 years) outdoor exposure tests of paints containing the pigment. Chalk/fade degradation of exterior paints containing $TiO_2$ pigments is partly attributed to catalytic action of the $TiO_2$ surface in the oxidation of the organic binder in the presence of ultraviolet radiation, oxygen, and water vapor (H. B. Clark, "Titanium Dioxide Pigments", Treatise on Coatings, Vol. 3, Pigments, Marcel Dekker, 1975).

In the examples that follow, the ultraviolet reactivity of $TiO_2$ pigments, prepared according to this invention, was measured in a test based on the $TiO_2$ catalyzed reduction of lead carbonate to lead metal. An air-sealed dispersion of non-durable $TiO_2$ pigment and lead carbonate in an organic medium turns from white to almost black by exposure to ultraviolet light. With durable $TiO_2$ pigments, the paste turns light gray. A drop of a paste of basic lead carbonate, glycerol, fumed silica, and $TiO_2$ pigment is put between two glass microscope slides and exposed to ultraviolet light for about five hours. The darkness of these slides is compared to Munsell chips and the Catalytic Activity Coefficient (CAC) values determined. A lower CAC value means a more photodurable TiO$_2$ pigment. Typical CAC values for commercial pigments are shown below:

| | |
|---|---|
| R-900 | 0.50 |
| R-902 R | 0.10 |
| R-960 | 0.01 |

(R-900, R-902 and R-960 are trade names for TiO$_2$ pigment manufactured by E. I. du Pont de Nemours and Company).

2. Viscosity

In the following examples, slurry viscosity data are based on Brookfield viscosity measurements made on slurries at 25° C., and 100 rpm, using a number 4 spindle for values up to 2000 centipoise (cp) and an appropriate spindle for higher viscosities.

3. Rheology

In the examples, slurry rheology data are obtained by measurements with a Hercules high shear device, operating at a shear rate of 2000 reciprocal seconds. The Hercules rheometer, made by Kaltec Scientific, Novi, Mich., has a rotating bob inside a cup filled with the slurry which transmits shear forces and deflects the spring. Results are reported in centipoise units.

4. Chalk/Fade (C/F) Resistance

The method used for measuring the chalk/fade degradation of paints containing the TiO$_2$ pigment in the following examples is described by W. H. Daiger and W. H. Madson in "Chalk-Fade Evaluation of Pigmented Finishes By Use of Instrumentation and Computer Analysis", *Journal of Paint Technology*, 1967, vol. 39, no. 510, pp. 399–410.

The basis of this test is that white objects (including TiO$_2$ particles) scatter all wavelengths of visible light equally. A paint is prepared with the desired pigment and then tinted blue with a copper phthalocyanine pigment. Panels coated with these paints are exposed in Florida for a specified period of time. The reflectance of red light from the panel is measured using a calorimeter. Since the fresh panels are blue (i.e., reflect all colors but red), red reflectance values are initially very low. The red reflectance increases as pigment particles are exposed and scatter all wavelengths of visible light equally.

Since the absolute rate of chalking depends on a number of variables, standards are used and sample results should be considered as relative to the standards.

EXAMPLES

In the following examples, different types of alumina prepared by the methods, "X" or "Y" were used to prepare the aqueous TiO$_2$ pigment slurries.

Method X For Preparing Alumina 1. 380 grams of citric acid were added to 40 liters of water at 60° C. to prepare a solution.
2. 8.6 kg of sodium aluminate (28 wt. % Al$_2$O$_3$ concentration or 400 grams Al$_2$O$_3$ liter of solution) were then added to the solution.
3. The pH of the solution was adjusted from 6.8 to 8.0 with concentrated HCl.
4. The precipitated alumina was stirred for 1 hour.
5. The alumina was then filtered and washed with an 18" plastic filter equipped with a continuous washing system which allowed the alumina to be purified to a wash water conductivity less than 2 microohms.
6. (Optional) The alumina filtercake was sheared under high shear processing to give a thick free-flowing alumina slurry.

Method Y For Preparing Alumina (Alternative)

1. 1030 ml. of sodium aluminate solution, containing the equivalent of 400 grams of Al$_2$O$_3$ per liter, and 670 ml. of 50% sulfuric acid, were prepared.
2. 7 gallons of water were added with stirring to a large laboratory tank.
3. The sodium aluminate solution and the sulfuric acid were added to the water over a period of 20 minutes, by means of "Masterflex" tubing pumps. The pH was measured every minute and was controlled at about 5 by the rate of sulfuric acid addition. About 1600 grams of ice were added to keep the temperature below 45° C.
4. The mixture was held, with stirring, for about 1 hour at about 40° C. at a pH of 5.
5. The material was filtered, washed, dried in an oven at 110° C., and screened through 18 mesh to break up any lumps.
6. This material contained about 67 wt. % alumina and about 33 wt. % water of hydration.

Example 1 (Comparative)

In this example, base TiO$_2$ pigment made by a standard chloride process was used to make a slurry. Pre-mixed surfactant was separately prepared, consisting of 20 g of water, 0.5 g of 50% citric acid solution, 4 g of triethanolamine (TEA) and 2 g of 2-amino-2-methyl-1-propanol (AMP) (i.e., 6 g of alcoholarnine). About 89 g of water was added to a vessel with agitation provided by an IKA mixer. The base TiO$_2$ pigment (500 g) along with the surfactant premix were then added to the vessel. The addition rate was slowed as slurry solids and viscosity increased, resulting in a slurry containing 80.3 wt. % TiO$_2$ solids at about 8.8 pH. Agitation was continued for 5 minutes to obtain a uniform deagglomerated slurry. 28 g of water were then added to dilute the slurry to about 76 wt. % TiO$_2$ solids. The properties for the resulting slurry are shown below in Table I.

Example 2 (Comparative)

In this example, the same base TiO$_2$ pigment used in Comparative Example 1 was first subjected to injector-treatment (IT) with 450° C. steam in accordance with the methods described in U.S. Pat. No. 4,083,946. Injector-treatment reduces the base TiO$_2$ pigment acidity/chlorides which reduces the amount of alcoholamine dispersant needed for pH control. By giving partial deagglomeration of the base pigment, injector-treated pigment can be processed at an increased solids content during the dispersion step.

This injector-treated base TiO$_2$ pigment was used to make a slurry following a similar procedure as described in Comparative Example 1. A pre-mixed surfactant was separately prepared, consisting of 20 g of water, 0.5 g of 50% citric acid solution, 1.2 g of TEA and 0.6 g of AMP (i.e., 1.8 g of alcoholamine). About 78 g of water was added to a vessel with agitation provided by an IKA mixer. The injector-treated base TiO$_2$ pigment (500 g) along with the surfactant premix was then added to the vessel. The addition rate was slowed as slurry solids and viscosity increased resulting in a slurry having 84.9 wt. % TiO$_2$ solids at about 8.8 pH. Agitation was continued for 5 minutes to obtain a uniform deagglomerated slurry. 60 g of water were then added to dilute the slurry to about 76 wt. % TiO$_2$ solids. The properties for the resulting slurry are shown below in Table I.

Example 3

The same base TiO$_2$ pigment from Comparative Example 1 was used to make the slurry in this example. Pre-mixed surfactant was separately prepared, consisting of 20 g of water, 1 g of 50% citric acid solution, 5 g of TEA and 2.5 g of AMP (i.e., 7.5 g of alcoholamine). Alumina paste prepared from the above-described "X" method was sheared after filtration to give a thick free-flowing slurry consisting of 16.8 g of alumina, 58.0 g of free water, and 8.2 g of water of hydration. About 54 g of water was added to a vessel with agitation provided by an IKA mixer. The base TiO$_2$ pigment (500 g) along with the alumina slurry (3.3 wt. % alumina based on weight of TiO$_2$ solids) and surfactant premix were added to the vessel. The addition rate was slowed as slurry solids and viscosity increased, resulting in a slurry having 80.4 wt. % TiO$_2$ solids at about 8.6 pH. Agitation was continued for 5 minutes to obtain a uniform deagglomerated slurry. 28 g of water were then added to dilute the slurry to about 76 wt. % TiO$_2$ solids. The properties for the resulting slurry are shown below in Table I.

Example 4

The same base TiO$_2$ pigment that had been subjected to the injector-treatment process as described in Comparative Example 2 was used to make the slurry in this example. Pre-mixed surfactant was separately prepared, consisting of 20 g of water, 1 g of 50% citric acid solution, 2.6 g of TEA and 1.3 g of AMP. (i.e., 3.9 g of alcoholamine). Alumina paste prepared from the above-described "X" method was sheared after filtration to give a thick free-flowing slurry consisting of 16.8 g of alumina, 58 g of free water, and 8.2 g of water of hydration. About 39 g of water was added to a vessel with agitation provided by an IKA mixer. Injector-treated base TiO$_2$ pigment (500 g) along with alumina slurry (3.3 wt. % alumina based on the weight of TiO$_2$ solids) and surfactant premix were added to the vessel. The addition rate was slowed as slurry solids and viscosity increased, resulting in 83 wt. % TiO$_2$ solids at about 8.8 pH. Agitation was continued for 5 minutes to obtain a uniform deagglomerated slurry. 42 g of water were then added to dilute the slurry to about 76 wt. % TiO$_2$ solids. The properties for the resulting slurry are shown below in Table I.

Example 5

In this example, base TiO$_2$ pigment made by a standard chloride process, wherein PCl$_3$ was used as the co-oxidant with TiCl$_4$ and Al$_2$O$_3$, as described in above-mentioned Glaeser, U.S. Pat. No. 4,214,913, was used to give base TiO$_2$ pigment with about 0.3 wt. % P$_2$O$_5$. This base pigment was more deagglomerated and would be expected to have improved slurry processing properties. The base pigment was first subject to injector-treatment. The injector-treated base TiO$_2$ pigment was then used to make a slurry following similar procedures as described in above Example 4.

Premixed surfactant was prepared, consisting of 20 g water, 5 g of 50% citric acid solution, 10.7 g of TEA and 5.3 g of AMP (i.e., 16 g of alcoholamine). Alumina paste prepared from the above-described "X" method was sheared after filtration to give a thick free-flowing slurry consisting of 81.1 g of alumina and 42.9 g of water of hydration. About 80 g of water was added to a vessel with agitation provided by an IKA mixer. Injector-treated base TiO$_2$ pigment (2500 g) along with alumina paste (3.3 wt. % alumina based on the weight of TiO$_2$ solids) and surfactant pre-mix were then added to the vessel. The addition rate was slowed as slurry solids and viscosity increased, resulting in a slurry having 82.4 wt. % TiO$_2$ solids at 8.5 pH. Agitation was continued for 5 minutes to obtain uniform deagglomeration. 54 g of water, 4.9 g of TEA, and 2.4 g of AMP were then added to give about a slurry having 76 wt. % TiO$_2$ solids slurry at 8.8 pH. The properties for the resulting slurry are shown below in Table I.

TABLE I

| EXAMPLE | CAC | C/F | BROOKFIELD VISCOSITY | RHEOLOGY |
|---|---|---|---|---|
| 1 (Comparative) | 0.19 | 2 | 1530 cp | 48 cp |
| 2 (Comparative) | 0.18 | 1 | 250 cp | 13 cp |
| 3 | 0.00 | 17 | 1326 cp | 48 cp |
| 4 | 0.00 | 17 | 598 cp | 21 cp |
| 5 | 0.06 | 10 | 700 cp | 34 cp |

Table 1 shows the improvement in photodurability of the TiO$_2$ slurry when amorphous alumina is used to prepare the slurry. Using injector-treated (IT) base TiO$_2$ pigment had no significant effect on photodurability, but it gave easier slurry processing and a final slurry product with improved rheology.

Example 6A (Comparative)

A TiO$_2$ slurry was prepared in the following manner:
1. 100 grams of water, 0.8 grams of AMP and 1.0 grams of 50 weight percent citric acid solution were added to a 1 liter beaker.
2. 20 grams of water, 3.2 grams of AMP and 4.0 grams of 50 weight percent citric acid solution were added to a separate beaker to form the surfactant premix.
3. 500 grams of base TiO$_2$ pigment made in the manner described in Example 2 were dry blended with 15 grams of dry amorphous alumina made from the above-described "Y" method to yield 3 wt. % dry alumina, based on the weight of TiO$_2$ solids which includes about 33% water of hydration not removed by the oven drying. Thus, the amount of pure alumina is 1.9 wt. % based on the weight of TiO$_2$ solids. The blend was split into 5 equal units.
4. With the use of a high speed mixer, one unit of the pigment/alumina blend was added to the beaker of step 1.
4. With the use of a high speed mixer, one unit of the pigment/alumina blend was added to the beaker of step 1.
5. With continued mixing, ¼ of the surfactant premix was added, followed by the addition of another unit of pigment/alumina blend. These additions were repeated 3 times to consume all of the surfactant premix and pigment/alumina. Additional AMP was added, as required, to maintain the pH above 7.0. The resulting slurry had 80 wt. % TiO$_2$ solids, and a pH of 7.2.
6. High speed mixing was continued for an additional 30 minutes.
7. Water and AMP were then added to adjust the slurry to 72 wt. % TiO$_2$ solids and a pH of 9.0.
8. The final slurry was screened to remove grit.

The properties for the resulting slurry are shown below in Table II.

Example 6B (comparative)

A TiO$_2$ slurry was prepared in the same manner as described in Example 6A, except the amount of amorphous alumina added to the slurry provided 2 wt. % dry alumina based on weight of TiO$_2$ solids which includes about 33% water of hydration not removed by the oven drying. Thus, the amount of pure alumina is 1.3 wt. % based on the weight of $TiO_2$ solids. The properties for the resulting slurry are shown below in Table II.

Example 6C (Comparative)

A $TiO_2$ slurry was prepared in the same manner as described in Example 6A, except the amount of amorphous alumina added to the slurry provided 1 wt. % dry alumina based on weight of $TiO_2$ solids which includes about 33% water of hydration not removed by the oven drying. Thus, the amount of pure alumina is 0.67 wt. % based on the weight of $TiO_2$ solids. The properties for the resulting slurry are shown below in Table II.

Example 6D (Comparative)

A $TiO_2$ slurry was prepared in the same manner as described in Example 6A, except no amorphous alumina was added to the slurry. The properties for the resulting slurry are shown below in Table II.

TABLE II

| EXAMPLE | WT. % ALUMINA | C/F | CAC |
| --- | --- | --- | --- |
| 6A (Comparative) | 1.90 | 4 | 0.09 |
| 6B (Comparative) | 1.30 | 3 | 0.17 |
| 6C (Comparative) | 0.67 | 2 | 0.22 |
| 6D (Comparative) | 0.00 | 1 | 0.38 |

These comparative examples (6A–6D) demonstrate that while photodurability improves by increasing the weight percentage of alumina coating, the photodurability is still not acceptable at the levels used in these comparative examples.

We claim:

1. A method for making a photodurable, aqueous titanium dioxide pigment slurry, comprising mixing amorphous alumina, $TiO_2$ pigment particles, water, and at least one dispersant to produce a photodurable, aqueous $TiO_2$ slurry comprising at least about 78 wt. % $TiO_2$ solids based on the total weight of slurry and at least about 3 wt. % alumina based on the total weight of $TiO_2$ solids.

2. The method of claim 1, wherein the slurry comprises about 78 to about 88 wt. % $TiO_2$ solids based on the total weight of slurry.

3. The method of claim 1, wherein the slurry comprises about 3 to about 5 wt. % alumina based on the total weight of $TiO_2$ solids.

4. The method of claim 1, wherein the dispersant is selected from the group consisting of citric acid, polyacrylates, triethanolamine, 2-amino-2-methyl-1-propanol, monoisopropylamine, and mixtures thereof.

5. The method of claim 4, wherein the pH of the slurry is at a level in the range of about 6.0 to about 9.0.

6. The method of claim 1, wherein the $TiO_2$ particles used to make the slurry are in rutile form.

7. The method of claim 6, wherein the rutile $TiO_2$ particles have a coating comprising about 0.1 to about 0.5 wt. % $P_2O_5$.

8. The method of claim 1, wherein the $TiO_2$ particles used to make the slurry are in anatase form.

9. A method for making a photodurable, aqueous titanium dioxide pigment slurry, comprising the steps of:

a) mixing amorphous alumina, $TiO_2$ pigment particles, water, and at least one dispersant to produce a photodurable, aqueous $TiO_2$ slurry comprising at least about 78 wt. % $TiO_2$ solids based on the total weight of slurry and at least about 3 wt. % alumina based on the total weight of $TiO_2$ solids; and b) diluting the slurry produced in step (a) to a $TiO_2$ solids content no greater than about 78 wt. %.

10. The method of claim 9, wherein the slurry produced in step (a) comprises about 78 to about 88 wt. % $TiO_2$ solids based on the total weight of slurry.

11. The method of claim 9, wherein the slurry produced in step (a) comprises about 3 to about 5 wt. % alumina based on the total weight of $TiO_2$ solids.

12. The method of claim 9, wherein the slurry produced in step (b) comprises about 68 to about 78 wt. % $TiO_2$ solids based on the total weight of $TiO_2$ solids.

13. The method of claim 9, wherein the dispersant is selected from the group consisting of citric acid, polyacrylates, triethanolamine, 2-amino-2-methyl-1-propanol, monoisopropylamine, and mixtures thereof.

14. The method of claim 13, wherein the pH of the slurry is at a level in the range of about 6.0 to about 9.0.

15. A method for making a photodurable, aqueous titanium dioxide pigment slurry, comprising the steps of:

a) mixing amorphous alumina, $TiO_2$ pigment particles, water, and at least one dispersant to produce a photodurable, aqueous $TiO_2$ slurry comprising at least about 78 wt. % $TiO_2$ solids based on the total weight of slurry and at least about 3 wt. % alumina based on the total weight of $TiO_2$ solids;

b) diluting the slurry produced in step (a) to a $TiO_2$ solids content no greater than about 78 wt. %;

c) screening the slurry to remove any grit; and d) media-milling the slurry to reduce the size of the $TiO_2$ particles.

16. The method of claim 15, wherein the slurry produced in step (a) comprises about 78 to about 88 wt. % $TiO_2$ solids based on the total weight of slurry.

17. The method of claim 15, wherein the slurry produced in step (a) comprises about 3 to about 5 wt. % alumina based on the total weight of $TiO_2$ solids.

18. The method of claim 15, wherein the slurry produced in step (b) comprises about 68 to about 78 wt. % $TiO_2$ solids based on the total weight of $TiO_2$ solids.

19. The method of claim 15, wherein the dispersant is selected from the group consisting of citric acid, polyacrylates, triethanolamine, 2-amino-2-methyl-1-propanol, monoisopropylamine, and mixtures thereof.

20. The method of claim 19, wherein the pH of the slurry is at a level in the range of about 6.0 to about 9.0.

* * * * *